US007697235B2

(12) United States Patent
Hayakawa et al.

(10) Patent No.: US 7,697,235 B2
(45) Date of Patent: Apr. 13, 2010

(54) MAGNETIC DISK DRIVE AND BASE WITH GUIDE (75) Inventors: Takako Hayakawa, Kanagawa (JP); Marutomo Goto, Kanagawa (JP); Kazuhide Ichikawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 631 days.

(21) Appl. No.: 11/398,827

(22) Filed: Apr. 5, 2006

(65) Prior Publication Data

US 2006/0221802 A1     Oct. 5, 2006

(30) Foreign Application Priority Data

Apr. 5, 2005    (JP)    ............................. 2005-108687

(51) Int. Cl.
G11B 25/04     (2006.01)
(52) U.S. Cl. ................................... 360/97.01
(58) Field of Classification Search ............. 360/97.01, 360/97.02, 97.03
See application file for complete search history.

(56) References Cited

U.S. PATENT DOCUMENTS 5,696,649 A * 12/1997 Boutaghou ............... 360/97.03
6,229,304 B1 * 5/2001 Guzik ......................... 324/212
6,452,753 B1 * 9/2002 Hiller et al. ............... 360/254.7
6,487,038 B1 * 11/2002 Izumi et al. ............... 360/97.02
6,614,751 B1    9/2003 Katao
7,215,507 B2 * 5/2007 Machcha et al. .......... 360/97.03

FOREIGN PATENT DOCUMENTS

JP          08-329655       12/1996
JP        2004-234784        8/2004

* cited by examiner

Primary Examiner—Angel A. Castro
(74) Attorney, Agent, or Firm—Townsend and Townsend and Crew LLP (57) ABSTRACT Embodiments of the invention provide a magnetic disk drive that allows members to be mounted onto a base simply and accurately. In one embodiment, a magnetic disk drive comprises: a base; a disk assembly including at least one magnetic disk and mounted rotatably on the base; and an actuator assembly including at least one actuator having a magnetic head and mounted swingably on the base. The base is formed with a guide. The guide functions to guide, when a member to be disposed on the base is to be mounted, the member from a corresponding initial placement position of the member on the base to a target position, at which the member is to be disposed. Further, the guide includes a positioning portion, against which the member abuts at the corresponding target position.

14 Claims, 7 Drawing Sheets

MAGNETIC DISK DRIVE AND BASE WITH GUIDE

CROSS-REFERENCES TO RELATED APPLICATIONS

This application claims priority from Japanese Patent Application No. JP2005-108687, filed Apr. 5, 2005, the entire disclosure of which is incorporated herein by reference.

BACKGROUND OF THE INVENTION

The present invention relates generally to a magnetic disk drive and, more specifically, to a base mounted with members forming the magnetic disk drive.

A magnetic disk drive, such as a hard disk drive, is formed by including a variety of members, such as a magnetic disk, a magnetic head, and the like. Many of these members forming the magnetic disk drive are mounted on a base that serves as a housing of the magnetic disk drive.

Conventionally, assembly robots, for example, have been used for mounting these members on the base. The assembly robot accurately transports each of the different members to a specified location and places the member correctly therein. See, e.g., Patent Document 1 (Japanese Patent Laid-open No. 08-329655).

BRIEF SUMMARY OF THE INVENTION

The conventional mounting method, however, requires that each individual member be accurately positioned using the assembly robot or the like. This makes operations involved highly complicated.

In view of the foregoing problem, the present invention has been made and it is a feature of the present invention to provide a magnetic disk drive that allows members to be mounted onto a base simply and accurately.

To solve the foregoing problem, a magnetic disk drive according an aspect of the present invention comprises: a base; a disk assembly including at least one magnetic disk and mounted rotatably on the base; and an actuator assembly including at least one actuator having a magnetic head and mounted swingably on the base. The magnetic disk drive is characterized in that the base includes a guide. The guide functions to guide, when a member to be disposed on the base is to be mounted, the member from a corresponding initial placement position of the member on the base to a target position, at which the member is to be disposed. Further, the guide includes a positioning portion, against which the member abuts at the corresponding target position.

DETAILED DESCRIPTION OF THE INVENTION

Figure 1:
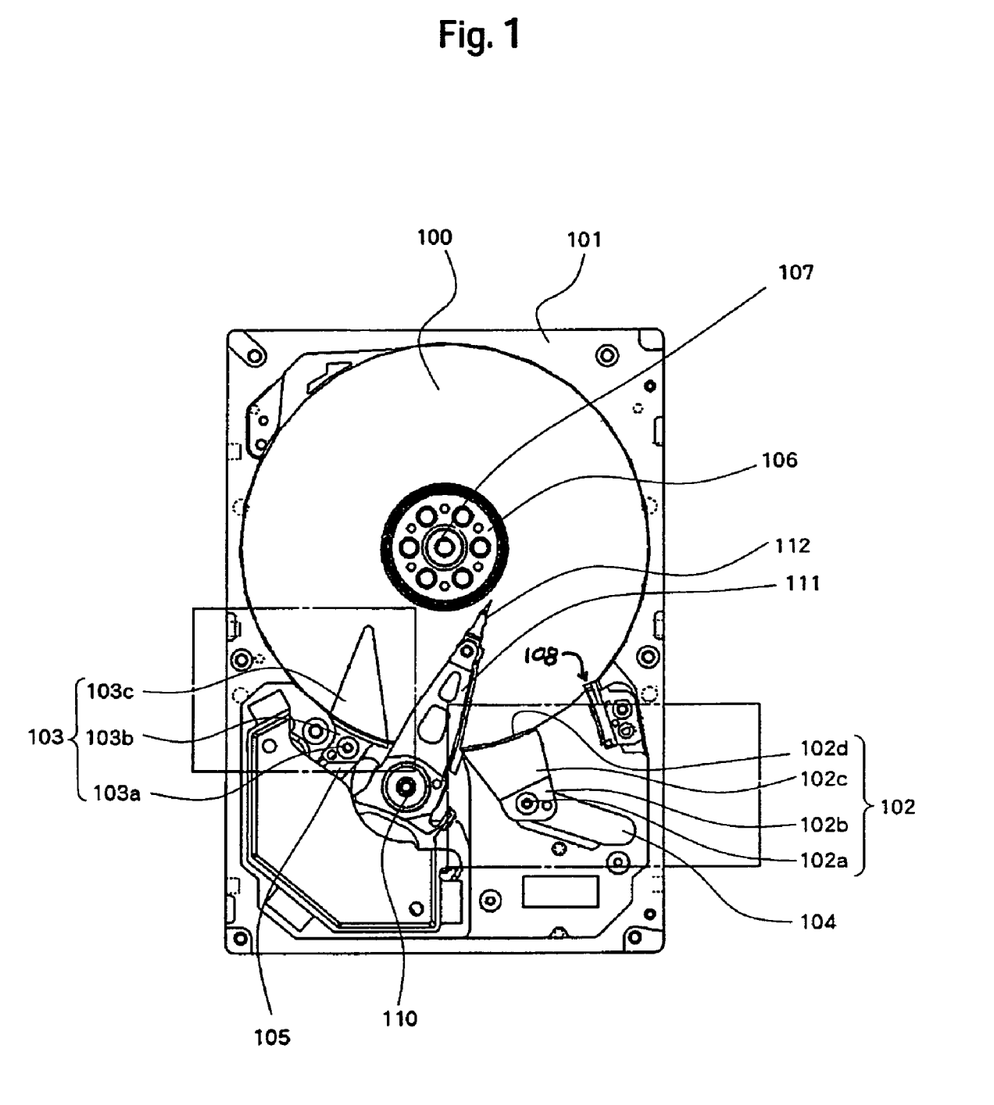
FIG. 1 is a top view showing the construction of a magnetic disk drive according to an embodiment of the present invention.

A magnetic disk drive according to an exemplary embodiment of the present invention will be described below with reference to the accompanying drawings. FIG. 1 is a top view showing the construction of the magnetic disk drive according to the embodiment of the present invention.

Referring to FIG. 1, the magnetic disk drive includes a base 101 serving as a housing, on which different members are mounted. Specifically, a spindle motor 107 is secured to the base 101. A disk assembly including a plurality of magnetic disks 100 is rotatably secured through a clamp 106 to the spindle motor 107. A spacer not shown is interposed between each pair of the plurality of magnetic disks 100 included in the disk assembly.

Also mounted in the base 101 is an actuator assembly including a plurality of actuators 111, each having a magnetic head 112 at the leading end thereof. The actuator assembly is swingably mounted about a pivot 110 by a voice coil motor 109.

The actuator assembly includes a plurality of magnetic heads 112, the number of which corresponds to the number of faces of the plurality of magnetic disks 100 included in the disk assembly.

The magnetic disk drive according to the embodiment of the present invention operates on, what is called, a load/unload system when performing an operation of writing data to, or reading data from, the magnetic disk 100. During the load/unload operation, the actuator 111 is swung to make the magnetic head 112 fly above a target sector on a surface of a specific magnetic disk 100 involved with the corresponding operation (a loaded condition). When the corresponding operation is not performed, the actuator 111 is swung to unload the magnetic head 112 from the magnetic disk 100 involved (an unloaded condition).

For this purpose, a ramp 108 is mounted on the base 101. The ramp 108 accommodates each of the plurality of magnetic heads 102 unloaded from above the magnetic disk 100 in the unloaded condition.

An air flow involved with rotation of the magnetic disk 100 is produced inside the housing of the magnetic disk drive. This air flow affects, for example, positioning accuracy of the magnetic head 112 above the magnetic disk 100.

Accordingly, the base 101 includes fluid control members for controlling an air flow so that an effect of the air flow involved with the rotation of the magnetic disk 100 on positioning and other operations of the magnetic head 112 can be reduced.

More specifically, the base 101 includes a shroud 102 and a spoiler 103 as the fluid control members.

The shroud 102 includes a base portion 102b and a plurality of fin-shaped portions 102c. The base portion 102b is mounted on the base 101 with a fixing screw 102a. The fin-shaped portions 102c extend from the base portion 102b toward an area where magnetic disks 100 are disposed. The fin-shaped portions 102c are to be inserted between each pair of the plurality of actuators 111, at least, in the unloaded condition.

The fin-shaped portions 102c are formed to correspond in number, and correspond substantially in thickness, with the magnetic disks 100.

A leading end surface 102d of each of the fin-shaped portions 102c is formed as an arcuate curved surface at a position opposing part of an outer peripheral end of each of the magnetic disks 100 so as to run along an outer peripheral end surface of each of corresponding ones of the magnetic disks 100.

The spoiler 103 includes a base portion 103b and a plurality of fin-shaped portions 103c. The base portion 103b is mounted on the base 101 with a fixing screw 103a. The fin-shaped portions 103c extend from the base portion 103b so as to be inserted between each pair of the plurality of magnetic disks 100. The fin-shaped portions 103c are formed to correspond in number with gaps between each pair of the magnetic disks 100 and inserted in these gaps.

The base 101 also includes guides 104, 105. The guides 104, 105 have two specific functions. Specifically, for one, the guides 104, 105 guide these fluid control members as the members are moved from corresponding initial placement positions (positions away predetermined distances from target positions indicated in FIG. 1 serving as the positions of placement of these fluid control members) to corresponding target positions on the base 101. For the other, the guides 104, 105 correctly position the fluid control members at the corresponding target positions.

More specifically, referring to FIG. 1, the base 101 includes a first guide 104 used for mounting and positioning the shroud 102 and a second guide 105 used for mounting and positioning the spoiler 103.

The guides 104, 105 will be described in detail in the following. The first guide 104 corresponding to the shroud 102 will be first described.

Figure 2:
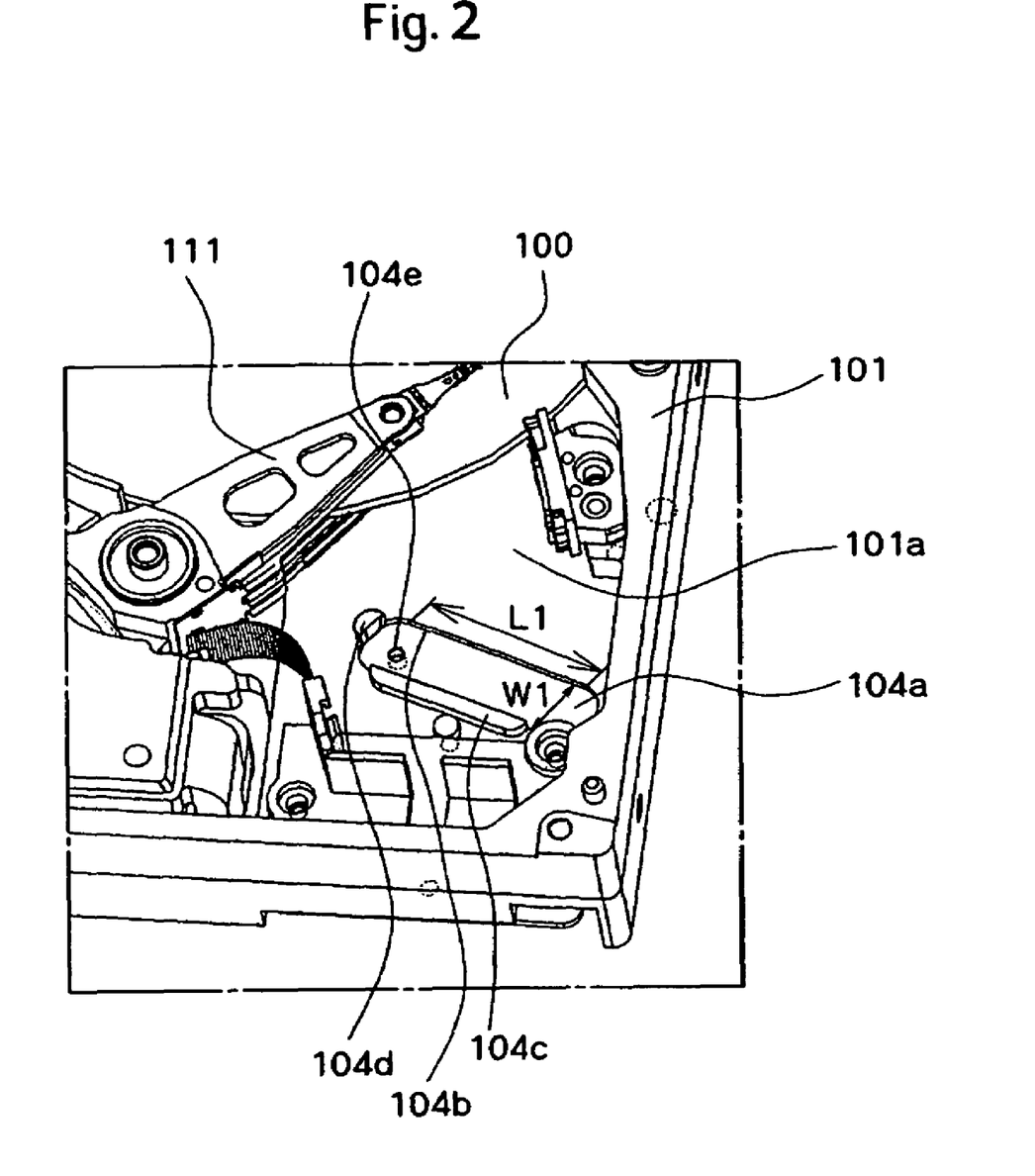
FIG. 2 is a perspective view showing a state where a shroud is yet to be mounted, for an exemplary case of a guide according to the embodiment of the present invention.

FIG. 2 is an enlarged perspective view showing an area A of the magnetic disk drive enclosed by a broken line in FIG. 1 in a state where the shroud 102 is yet to be mounted. Referring to FIG. 2, the first guide 104 is formed with a guide groove with a predetermined depth. This guide groove includes a first guide bottom surface 104a as the bottom surface of the guide groove and a first guide side surface 104b surrounding the first guide bottom surface 104a with the predetermined depth.

The guide groove is formed by, for example, shaving a bottom surface 101a of the base 101 to a predetermined depth.

The first guide bottom surface 104a is formed substantially into a rectangle having a substantially constant width W1 throughout a range of a length L1 in a longitudinal direction. The first guide bottom surface 104a includes a fixing hole 104e, in which the fixing screw 102a (see FIG. 1) for securing the shroud 102 to the base 101 is inserted. The fixing hole 104e is disposed at an area near an end of the first guide bottom surface 104a proximal to the magnetic disks 100 (a target position, at which the shroud 102 is to be disposed in an assembled state shown in FIG. 1; the target position will hereinafter be referred to as a first target position).

The first guide 104 also includes a protruded first positioning portion 104c and a protruded second positioning portion 104d. Each of the first positioning portion 104c and the second positioning portion 104d continues to part of the first guide side surface 104b to have a predetermined height.

The first positioning portion 104c is formed so as to continue to a part that runs in the longitudinal direction of the first guide side surface 104b. The second positioning portion 104d is formed so as to continue to a portion of the first target position of the first guide side surface 104b.

Figure 3:
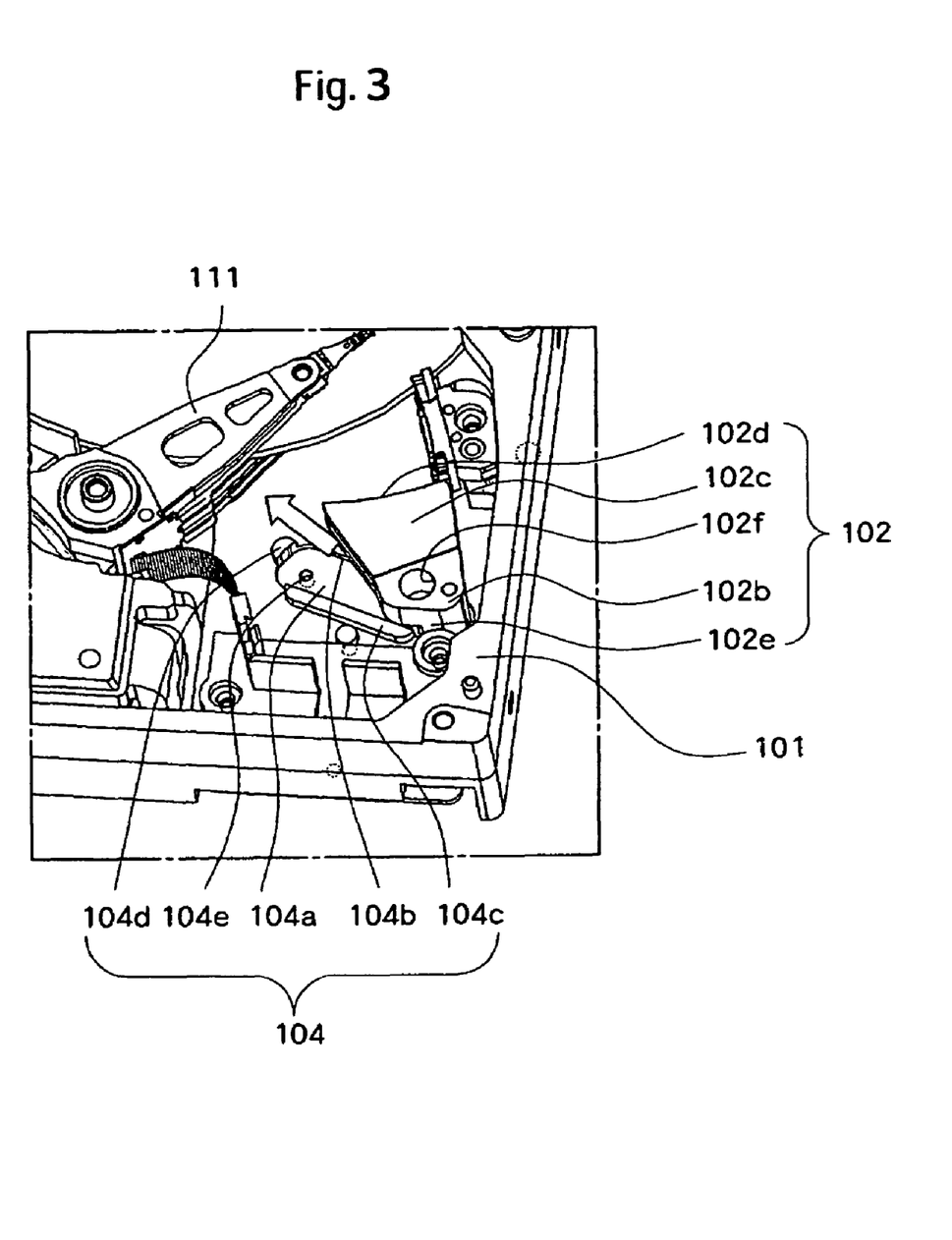
FIG. 3 is a perspective view showing a state where the shroud is placed at an initial placement position, for an exemplary case of a guide according to the embodiment of the present invention.

FIG. 3 is a perspective view showing a state where the shroud 102 is placed at an end of the first guide 104 shown in FIG. 2 distal from the magnetic disks 100 (the end will hereinafter be referred to as a first initial placement position). The state represents an initial step in mounting operations of the shroud 102.

In the state shown in FIG. 3, the shroud 102 is in the following condition. Specifically, a lower surface of a guided portion 102e formed near a lower end of the base portion 102b abuts against a portion corresponding to the first initial placement position of the first guide bottom surface 104a. Further, a side surface of the guided portion 102e abuts against part of the first guide side surface 104b and part of the first positioning portion 104c. More specifically, the shroud 102 is fitted in the guide groove formed in the first guide 104 at the first initial placement position of the first guide 104.

Figure 4:
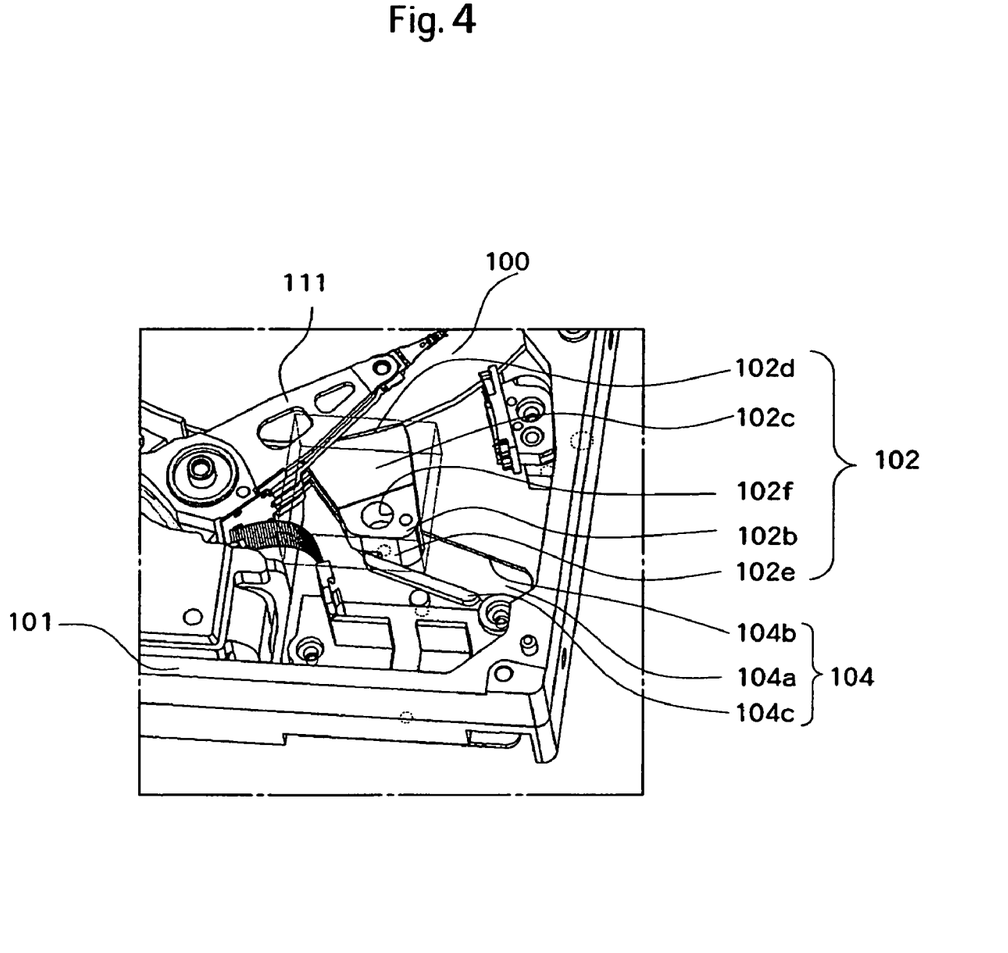
FIG. 4 is a perspective view showing a state where the shroud is fixed at a target position, for an exemplary case of a guide according to the embodiment of the present invention.

FIG. 4 is a perspective view showing a state where the shroud 102 is disposed at the end of the first guide 104 proximal to the magnetic disks 100, or the first target position. The state represents a final step in the mounting operations of the shroud 102.

In the state shown in FIG. 4, the shroud 102 is in the following condition. Specifically, the lower surface of the guided portion 102e abuts against a portion corresponding to the first initial placement position of the first guide bottom surface 104a. Further, the side surface of the guided portion 102e abuts against part of the first positioning portion 104c and the second positioning portion 104d. More specifically, the shroud 102 is fitted in the guide groove formed in the first guide 104 at the first target position of the first guide 104.

The mounting steps for the shroud 102 covering from the initial step shown in FIG. 3 to the final step shown in FIG. 4 will be hereunder described.

Referring to FIG. 3, after the magnetic disks 100, the actuators 111, and the like have been mounted to the base 101, the shroud 102 is placed at the first initial placement position of the first guide 104 using, e.g., an assembly robot or the like.

At this time, the guided portion 102e of the shroud 102 abuts against the first guide bottom surface 104a, the first guide side surface 104b, and the first positioning portion 104c (that is, the shroud 102 is fitted in the guide groove), as described above. Accordingly, the shroud 102 is restrained from rotating in a horizontal direction (the direction along the bottom surface 101a of the base 101).

An assembly robot or the like, for example, may then be used to slide the shroud 102 placed at the first initial placement position shown in FIG. 3 in the direction of an arrow shown in FIG. 3, that is, in the direction toward the area where the magnetic disks 100 are disposed.

In this step of sliding of the shroud 102, the shroud 102 makes a smooth linear motion along the first guide bottom surface 104a from the first initial placement position shown in FIG. 3 to the first target position shown in FIG. 4. This linear motion occurs with the lower surface of the guided portion 102e abutted against the first guide bottom surface 104a and with the side surface of the guided portion 102e abutted against the first guide side surface 104b and the first positioning portion 104c. That is, the shroud 102 makes this smooth linear motion with the guided portion 102e fitted in the guide groove.

Specifically, in this sliding step, the first guide 104 guides the shroud 102 along the guide groove from the first initial placement position to the first target position.

The shroud 102 is then stopped from moving further at the first target position shown in FIG. 4 by bringing the side surface of the guided portion 102e into abutment with the second positioning portion 104d.

At the first target position, the guided portion 102e of the shroud 102 brings the lower surface thereof into abutment with the first target position of the first guide bottom surface 104a and the side surface thereof into abutment with the first positioning portion 104c and the second positioning portion 104d.

Accordingly, the shroud 102 is restrained from turning in the horizontal direction at the first target position. As described in the foregoing, the shroud 102 is accurately positioned at the first target position defined by the first guide 104 previously formed on the base 101. It is to be noted herein that the angle formed between the first positioning portion 104c and the second positioning portion 104d is equal to, or less than, 90°. Specifically, the surface of the first positioning portion 104c abutting on the guided portion 102e and the surface of the second positioning portion 104d abutting on the guided portion 102e are formed such that the angle formed therebetween is equal to, or less than, 90°. This ensures that the shroud 102 is positioned at the second positioning portion 104d without allowing the direction of the linear motion of the shroud 102 guided by the first positioning portion 104c to be changed, and is disposed so as to be restrained from turning.

With the shroud 102 at the first target position, the fixing screw 102a (see FIG. 1) is inserted in a threaded hole 102f in the base portion 102b of the shroud 102 and, with the fixing screw 102a, the shroud 102 is secured to the base 101.

The lower surface and/or side surface of the guided portion 102e of the shroud 102, and the first guide bottom surface 104a, the first positioning portion 104c, and/or the second positioning portion 104d to be brought in abutment with the lower surface and/or the side surface of the guided portion 102e, and at least portions that are brought in mutual abutment with each other, may be subjected to a smooth machining process and a smooth treatment.

It becomes thereby possible to reduce friction resistance of the shroud 102 during the sliding motion thereof from the first initial placement position to the first target position. It is also possible to prevent dust and dirt that could otherwise be produced due to friction between the shroud 102 and the first guide 104 from being produced.

Figure 5:
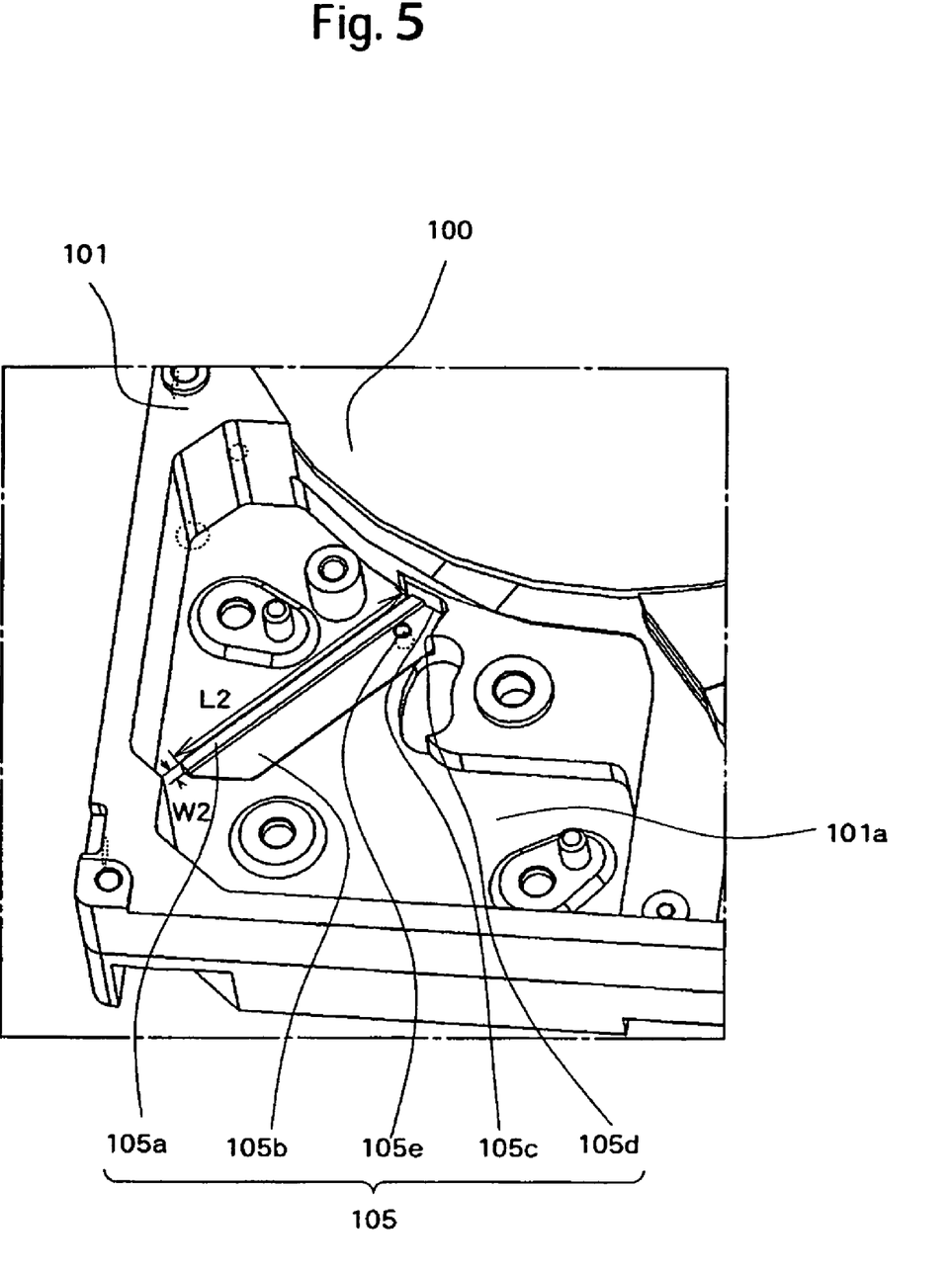
FIG. 5 is a perspective view showing a state where a spoiler is yet to be mounted, for an exemplary case of a guide according to the embodiment of the present invention.

FIG. 5 is an enlarged perspective view showing an area B of the magnetic disk drive enclosed by a broken line in FIG. 1 in a state where the spoiler 103 is yet to be mounted. Referring to FIG. 5, the second guide 105 includes a protruded guide rail 105a having a predetermined height on the bottom surface 101a of the base 101.

The guide rail 105a is formed substantially into a rectangular parallelepiped having a substantially constant width W2 throughout a range of a length L2 in a longitudinal direction.

The second guide 105 also includes a second guide bottom surface 105b formed so as to continue from, and run along, the guide rail 105a. The second guide bottom surface 105b is formed to have a slight height smaller than the height of the guide rail 105a.

The second guide bottom surface 105b includes a fixing hole 105e, in which the fixing screw 103a (see FIG. 1) for securing the spoiler 103 to the base is inserted. The fixing hole 105e is disposed at an area near an end of the second guide bottom surface 105b proximal to the magnetic disks 100 (a target position, at which the spoiler 103 is to be disposed in an assembled state shown in FIG. 1; the target position will hereinafter be referred to as a second target position).

The second guide 105 also includes a third positioning portion 105c and a fourth positioning portion 105d, each having a predetermined height. Each of the third positioning portion 105c and the fourth positioning portion 105d is disposed at an area near an end portion of the guide rail 105a and an end portion of the second guide bottom surface 105b proximal to the magnetic disks 100.

The third positioning portion 105c is disposed on the end portion of the guide rail 105a and the end portion of the second guide bottom surface 105b proximal to the magnetic disks 100.

The fourth positioning portion 105d is disposed near the end portion of the guide rail 105a and the end portion of the second guide bottom surface 105b proximal to the magnetic disks 100, at a position opposing the guide rail 105a across the second guide bottom surface 105b.

Figure 6:
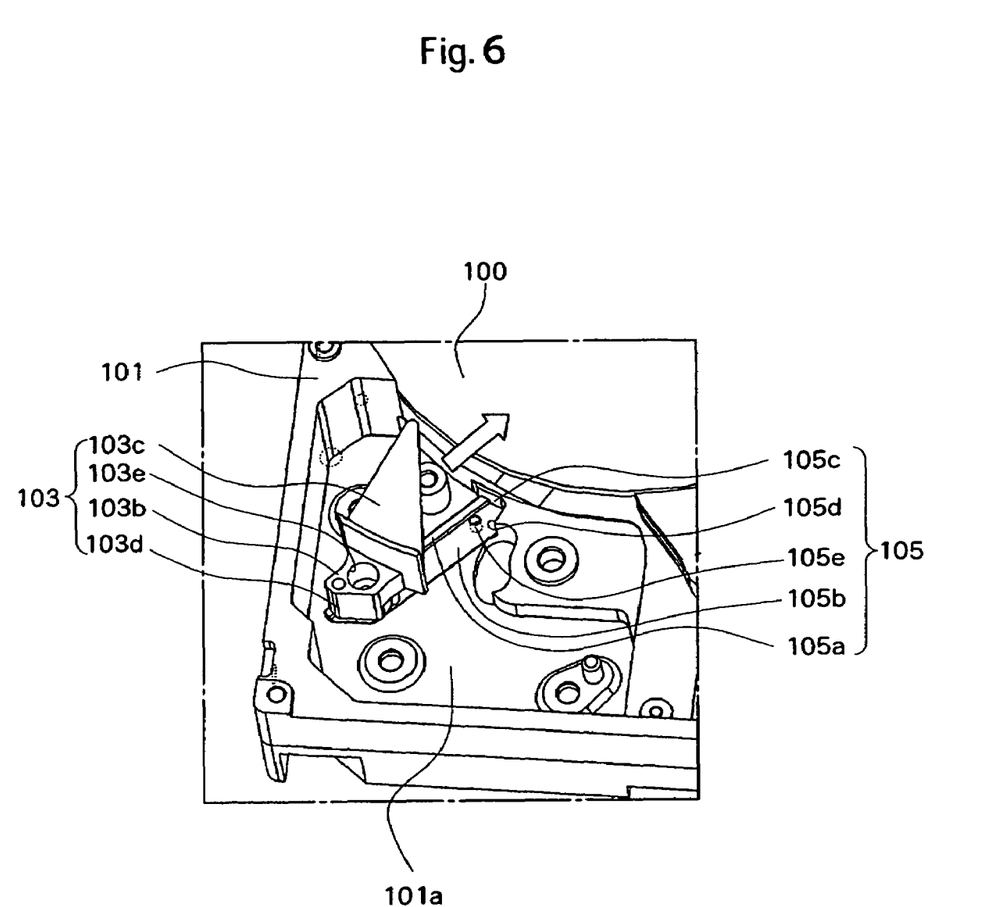
FIG. 6 is a perspective view showing a state where the spoiler is placed at an initial placement position, for an exemplary case of a guide according to the embodiment of the present invention.

FIG. 6 is a perspective view showing a state where the spoiler 103 is placed at an end of the second guide 105 shown in FIG. 5 distal from the magnetic disks 100 (the end will hereinafter be referred to as a second initial placement position). The state represents an initial step in mounting operations of the spoiler 103.

In the state shown in FIG. 6, the spoiler 103 is placed at the second initial placement position in the following condition. Specifically, part of a lower surface of a guided portion 103d formed near a lower end of the base portion 103b is fitted in a portion corresponding to the second initial placement position of the guide rail 105a. Further, part of a side surface of the guided portion 103d is abutted on the second guide bottom surface 105b. The lower surface of the guided portion 103d of the spoiler 103 includes a guide groove (not shown), in which the guide rail 105a is fitted.

Figure 7:
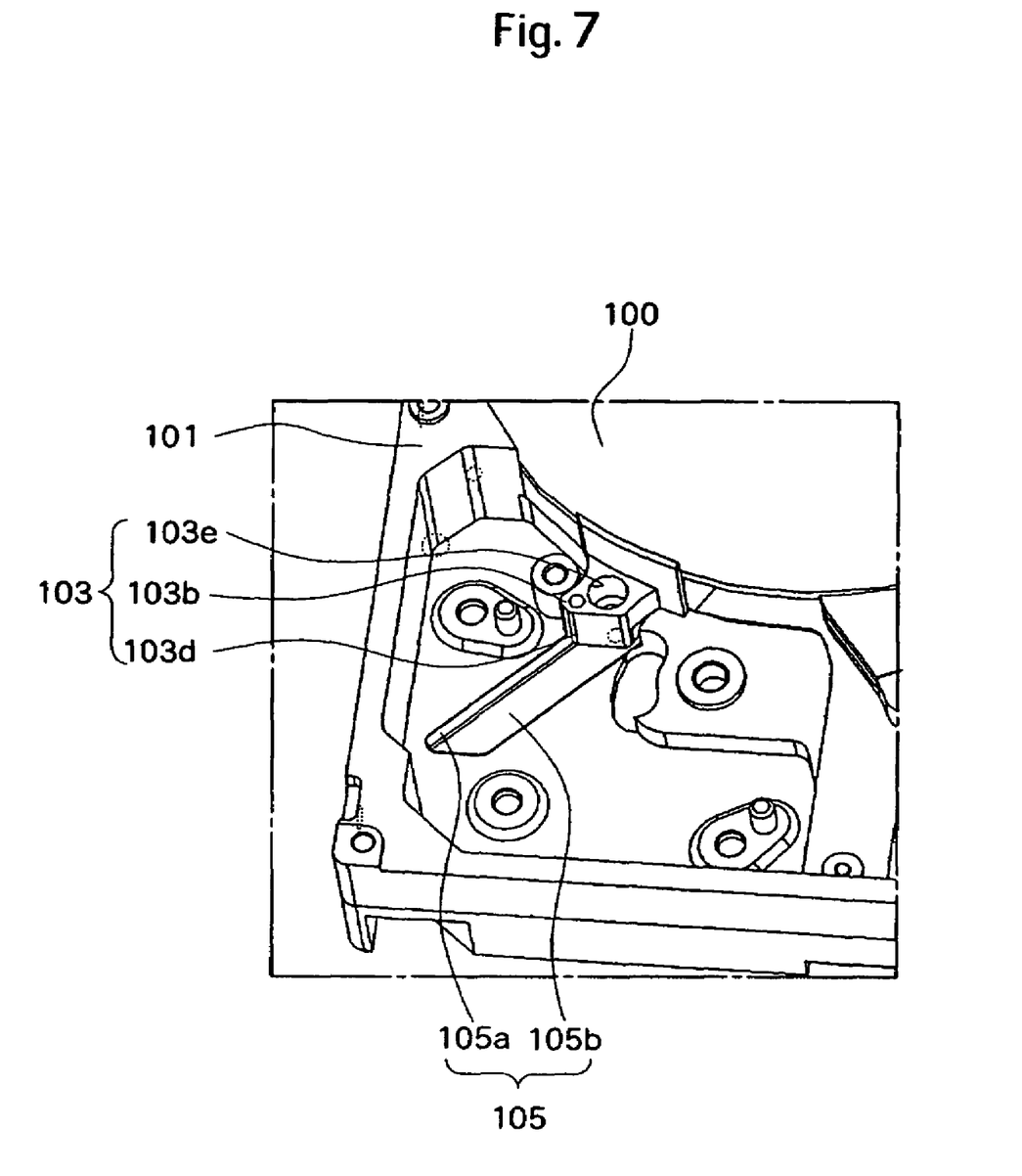
FIG. 7 is a perspective view showing a state where the spoiler is fixed at a target position, for an exemplary case of a guide according to the embodiment of the present invention.

FIG. 7 is a perspective view showing a state where the spoiler 103 is disposed at the end of the second guide 105 shown in FIG. 5 proximal to the magnetic disks 100, or the second target position. The state represents a final step in the mounting operations of the spoiler 103.

In the state shown in FIG. 7, the spoiler 103 is disposed at the target position of the second guide 105 by achieving the following conditions. More specifically, the guide groove formed in the lower surface of the guided portion 103d is fitted in the portion corresponding to the second target position of the guide rail 105a. Further, part of the bottom surface of the guided portion 103d is abutted on the second guide bottom surface 105b. The mounting steps for the spoiler 103 covering from the initial step shown in FIG. 6 to the final step shown in FIG. 7 will be hereunder described.

Referring to FIG. 6, after the magnetic disks 100, the actuators 111, and the like have been mounted to the base 101, an assembly robot or the like, for example, may be used to place the spoiler 103 at the second initial placement position of the second guide 105.

At this time, the guide rail 105a fits into the guide groove formed in the guided portion 103d of the spoiler 103 and the bottom surface of the guided portion 103d abuts on the second guide bottom surface 105b, as described above. Accordingly, the spoiler 103 is restrained from turning in a horizontal direction.

An assembly robot or the like, for example, may then be used to slide the spoiler 103 placed at the second initial placement position shown in FIG. 6 in the direction of an arrow shown in FIG. 6, that is, in the direction toward the area where the magnetic disks 100 are disposed.

In this step of sliding of the spoiler 103, the spoiler 103 makes a smooth linear motion along the guide rail 105a and the second guide bottom surface 105b from the second initial placement position shown in FIG. 6 to the second target position shown in FIG. 7. This linear motion occurs with the guide rail 105a fitted into the guide groove formed in the guided portion 103d of the spoiler 103 and with the bottom surface of the guided portion 103d abutted on the second guide bottom surface 105b.

Specifically, in this sliding step, the second guide 105 guides the spoiler 103 from the second initial placement position to the second target position.

The spoiler 103 is then stopped from moving further at the second target position shown in FIG. 7 by bringing the side surface of the guided portion 103d into abutment with the third positioning portion 105c and the fourth positioning portion 105d.

More specifically, the spoiler 103 assumes the following conditions at the second target position. Specifically, the second target position of the guide rail 105a is fitted in the guide groove in the guided portion 103d of the spoiler 103. Further, the side surface of the guided portion 103d of the spoiler 103 is abutted on the third positioning portion 105c and the fourth positioning portion 105d. It is to be noted herein that the angle formed between the third positioning portion 105c and the fourth positioning portion 105d is equal to, or less than, 90°. Specifically, the surface of the third positioning portion 105c abutting on the guided portion 103d and the surface of the fourth positioning portion 105d abutting on the guided portion 103d are formed such that the angle formed therebetween is equal to, or less than, 90°. This ensures that the spoiler 103 is positioned at the fourth positioning portion 105d without allowing the direction of the linear motion of the spoiler 103 guided by the third positioning portion 105c to be changed, and is disposed so as to be restrained from turning.

Accordingly, the spoiler 103 is restrained from turning in the horizontal direction at the second target position. Through the steps as described in the foregoing, the spoiler 103 is accurately positioned at the second target position defined by the second guide 105 that has previously been formed on the base 101.

With the spoiler 103 at the second target position, the fixing screw 103a (see FIG. 1) is inserted in a threaded hole 103e in the base portion 103b of the spoiler 103 and, with the fixing screw 103a, the spoiler 103 is secured to the base 101.

The lower surface and/or the side surface of the guided portion 103d of the spoiler 103, and an inner surface of the guide groove formed in the lower surface, a surface of the guide rail 105a in contact with the guide groove in the guided portion 103d, the second guide bottom surface 105b, the third positioning portion 105c, the fourth positioning portion 105d, and at least portions that are brought in mutual abutment with each other, may be subjected to a smooth machining process and a smooth treatment.

It becomes thereby possible to reduce friction resistance of the spoiler 103 during the sliding motion thereof from the second initial placement position to the second target position. It is also possible to prevent dust and dirt that could otherwise be produced due to friction between the spoiler 103 and the second guide 105 from being produced.

The magnetic disk drive according to the present invention is not limited to the aforementioned embodiment. Specifically, for example, the member to be mounted on the base 101 as guided by the guides 104, 105 is not limited to the fluid control member. Rather, the member to be mounted on the base 101 as guided by the guides 104, 105 may be any other member that is to be disposed on the base 101.

The first guide bottom surface 104a and the guide rail 105a are not limited to a type that is formed to have a substantially constant width over a predetermined length. Rather, for example, the first guide bottom surface 104a or the guide rail 105a may be formed into a taper having a width that slightly increases toward the target position as compared with a width at the initial placement position.

The magnetic disks 100, the magnetic heads 112, and the like mounted to the magnetic disk drive are not limited to a multiple configuration. Rather, only a single magnetic disk, a single magnetic head, or the like may be mounted.

The shape, quantity, position, size, and the like of the positioning portions 104c, 104d, 105c, 105d, the guide bottom surfaces 104a, 105b, and the like formed on the guides 104, 105 are not limited to those described in the foregoing. Rather, it is only needed that the guides 104, 105 be formed such that the members subjected to placement and positioning placed at the initial placement positions on the base 101 are guided to the target positions, at which the members are to be disposed, on the base 101 and such that the members can be positioned correctly while being restrained from turning or making any other motion at the target positions.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive, comprising:
    a base;
    a disk assembly including at least one magnetic disk, the disk assembly mounted rotatably on the base; and
    an actuator assembly including at least one actuator having a magnetic head, the actuator assembly mounted swingably on the base;
    a ramp configured to allow the magnetic head to access the magnetic disk;
    wherein the base includes a first guide configured to guide a shroud disposed on the base from a corresponding first initial placement position to a first target position at which the shroud is to be disposed, the first guide including a first positioning portion, against which the shroud abuts at the corresponding first target position,
    wherein the first guide includes a first guide groove that continues from the first initial placement position to the first target position, and
    wherein the base further includes a second guide configured to guide a spoiler disposed on the base from a corresponding second initial placement position to a second target position at which the spoiler is to be disposed, the second guide including a second positioning portion, against which the spoiler abuts at the corresponding second target position.

2. The magnetic disk drive according to claim 1,
    wherein the disk assembly includes a plurality of magnetic disks;
    wherein the actuator assembly includes a plurality of actuators; and
    wherein the member includes an inserted portion to be inserted between each pair of the plurality of magnetic disks or each pair of the plurality of actuators at the target position.

3. The magnetic disk drive according to claim 1,
    wherein the guide groove is linear.

4. The magnetic disk drive according to claim 1,
    wherein the guide includes a protruded guide rail that continues from the initial placement position to the target position.

5. The magnetic disk drive according to claim 4, wherein the protruded guide rail is linear.

6. The magnetic disk drive according to claim 1, wherein the member guided by the guide comprises a fluid control member to control fluid flow in the magnetic disk drive.

7. The magnetic disk drive according to claim 1, wherein the shroud has at least one fin-shaped portion extending toward an area where the at least one magnetic disk is disposed in a target position.

8. The magnetic disk drive according to claim 7, wherein the at least one fin-shaped portion is disposed between a pair of actuators of the actuator assembly in an initial placement position.

9. The magnetic disk drive according to claim 7, wherein the at least one fin-shaped portion corresponds in number and substantially in thickness with the at least one magnetic disk.

10. The magnetic disk drive according to claim 7, wherein the at least one fin-shaped portion each includes an arcuate curved surface at a position opposing part of an outer peripheral end of each magnetic disk.

11. The magnetic disk drive according to claim 1, wherein the spoiler has at least one fin-shaped portion to be inserted between a pair of magnetic disks.

12. The magnetic disk drive according to claim 11, wherein the at least one fin-shaped portion corresponds in number with gap between each pair of magnetic disks.

13. A magnetic disk drive, comprising:
a base;
a disk assembly including at least one magnetic disk, the disk assembly mounted rotatably on the base; and
an actuator assembly including at least one actuator having a magnetic head, the actuator assembly mounted swingably on the base;
a ramp configured to allow the magnetic head to access the magnetic disk;
wherein the base includes first means for guiding a shroud disposed on the base, from a corresponding first initial placement position to a first target position, at which the shroud is to be disposed, the guide means including a first positioning portion, against which the shroud abuts at the corresponding first target position,
wherein the first guide means includes a guide groove that continues from the first initial placement position to the first target position; and
wherein the base further includes second means for guiding a spoiler disposed on the base, from a corresponding second initial placement position to a second target position, at which the spoiler is to be disposed, the second guide means including a second positioning portion, against which the spoiler abuts at the corresponding second target position.

14. The magnetic disk drive according to claim 13, wherein the disk assembly includes a plurality of magnetic disks;
wherein the actuator assembly includes a plurality of actuators; and
wherein the shroud includes an inserted portion to be inserted between each pair of the plurality of magnetic disks or each pair of the plurality of actuators at the first target position.

* * * * *